United States Patent [19]
Campbell et al.

[11] 3,864,416
[45] Feb. 4, 1975

[54] SEPARATION OF TETRA-ALKYL SUBSTITUTED AROMATIC HYDROCARBON ISOMERS

[75] Inventors: Douglas R. Campbell, Brookfield; James W. Priegnitz, Elgin, both of Ill.

[73] Assignee: Universal Oil Products Company, Des Plaines, Ill.

[22] Filed: Mar. 18, 1974

[21] Appl. No.: 452,481

[52] U.S. Cl. ............................ 260/674 A, 208/310
[51] Int. Cl. ............................................. C07c 7/12
[58] Field of Search ............... 260/674 SA; 208/310

[56] References Cited
UNITED STATES PATENTS

| | | | |
|---|---|---|---|
| 3,114,782 | 12/1963 | Fleck et al. | 260/674 |
| 3,699,182 | 10/1972 | Cattanach | 260/674 |
| 3,734,974 | 5/1973 | Neuzil | 260/674 |

Primary Examiner—Delbert E. Gantz
Assistant Examiner—C. E. Spresser
Attorney, Agent, or Firm—James R. Hoatson, Jr.; Thomas K. McBride; William H. Page, II

[57] ABSTRACT

An adsorptive separation process for separating tetra-alkyl substituted monocyclic aromatic isomers, the alkyl constituents containing from one to four carbon atoms each, from a feed mixture comprising at least two of the isomers, which process employs a crystalline aluminosilicate adsorbent containing a specific cation or cations at the exchangeable cationic sites to selectively adsorb a component of the feed mixture. A desorption step may then be used to desorb the adsorbed feed component. The process can be either in the liquid or vapor phase.

The process finds particular usefulness in the separation of isomers of trimethylcumene.

20 Claims, No Drawings

SEPARATION OF TETRA-ALKYL SUBSTITUTED AROMATIC HYDROCARBON ISOMERS

BACKGROUND OF THE INVENTION

1. Field of the Invention

The field of art to which the claimed invention pertains is solid-bed adsorptive separation. More specifically, the claimed invention relates to a process for the separation of tetra-alkyl substituted monocyclic aromatic hydrocarbon isomers having alkyl components with one to four carbon atoms each which process uses a particular solid adsorbent which selectively removes one or more of the isomers from a feed mixture.

2. Description of the Prior Art

It is well known in the separation art that certain crystalline aluminosilicates can be used to separate hydrocarbons species from mixtures thereof. In particular, the separation of normal paraffins from branched chained paraffins can be accomplished by using the type A zeolite which have pore openings from 3 to about 5 angstroms. Such a separation process is disclosed, for example, in U.S. Pat. Nos. 2,985,589 and 3,201,491. These adsorbents allow a separation based on the physical size differences in the molecules by allowing the smaller or normal hydrocarbons to be passed into the cavities within the crystalline aluminosilicate adsorbent, while excluding the larger or branched chain molecules.

U.S. Pat. Nos. 3,265,750 and 3,510,423, for example, disclose processes in which larger pore diameter zeolites such as the type X or type Y structured zeolites can be used to separate olefinic hydrocarbons.

In addition to separating hydrocarbon types, the type X or type Y zeolites have also been employed in processes to separate individual hydrocarbon isomers. In the processes described in U.S. Pat. Nos. 3,558,730; 3,558,732; 3,626,020 and 3,686,342, for example, they are used to separate desired xylene isomers; in U.S. Pat. No. 3,114,782 they are used to separate alkyltrisubstituted benzene; and in U.S. Pat. No. 3,668,267 they are used to separate particular alkyl substituted naphthalenes.

The present invention relates to a process for the separation of tetra-alkyl substituted monocyclic aromatic hydrocarbon isomers having alkyl constituents of from one to four atoms each.

We have found that type X or type Y structured zeolites containing at exchangeable cationic sites at least one cation selected from the group consisting of cations of Group I-A metals exhibit selectivity for a tetra-alkyl substituted monocyclic aromatic hydrocarbon isomer with respect to another such isomer thereby making separation by solid-bed selective adsorption processes possible.

More specifically, we have found that 2,4,5-trimethylcumene (hereinafter TMC) can be separated from the 2,3,5-TMC and the 2,3,6-TMC isomers by a process which employs such a zeolite as an adsorbent.

The particular merit and utility of this separation is that the 2,4,5-TMC isomer is a substitute for durene, 1,2,4,5-tetramethylbenzene, which is oxidized to pyromellitic dianhydride (PMDA) and is used for the production of polyimide resins. These polymers have the particular ability to withstand temperatures of 500°F. continuously and up to 900°F. intermittently.

Since the worldwide production of durene is at a much lower volume than is the production of the more common chemical pseudocumene (1,2,4-trimethylbenzene), the production of PMDA from isopropylpseudocumene (2,4,5-TMC) is of potential merit if it can be separated from the other TMC isomers. Isopropylpseudocumene is made by the alkylation of pseudocumene with propylene in the presence of hydrogen fluoride or solid phosphoric acid catalyst. However, this alkylation results in the formation of a roughly 70–30 mixture of 2,4,5-TMC and 2,3,5-TMC with a minor amount, 2% or less, of the 2,3,6-TMC isomer. Since these isomers are close boiling, their separation by distillation is not practical.

By the process of this invention the 2,4,5-TMC isomer can be separated from the other TMC isomers.

SUMMARY OF THE INVENTION

It is, accordingly, a broad objective of our invention to provide a process for the separation of tetra-alkyl substituted monocyclic aromatic hydrocarbon isomers, the alkyl constituents containing from one to four carbon atoms each, from a feed mixture comprising at least two of these isomers.

Since trimethylcumene isomers are among the very few of such tetra-alkyl substituted isomers having commercial potential or significance, it is a more specific objective of our invention to provide a process for the separation of the 2,4,5-TMC isomer from the other TMC isomers.

In brief summary our invention is, in one embodiment, a process for separating tetra-alkyl substituted monocyclic aromatic isomers, the alkyl constituents containing from one to four carbon atoms each, from a hydrocarbon feed mixture comprisiing at least two of said isomers which process comprises contacting said feed with a crystalline aluminosilicate selected from the group consisting of type X structured and type Y structured zeolites containing at exchangeable cationic sites at least one cation selected from the group consisting of cations of Group I-A metals thereby selectively adsorbing at adsorption conditions one or more of said isomers.

More specifically, our invention is, in a more preferred embodiment, a process for separating trimethylcumene isomers from a hydrocarbon feed mixture comprising 2,4,5-trimethylcumene and at least one other trimethylcumene isomer which process comprises contacting said feed with a solid adsorbent selected from the group consisting of type X and type Y structured zeolites containing at exchangeable cationic sites at least one cation selected from the group consisting of cations of Group I-A metals whereby there is obtained a raffinate stream comprising less selectively adsorbed components of said mixture and a rich adsorbent containing a more selectively adsorbed components of said mixture, the ratio of said isomers in said raffinate stream being different from the ratio of said isomers in said feed mixture.

In another embodiment the adsorbent used in the process of the invention contains a substrate selected from the group consisting of water, methanol and ethanol.

Other embodiments and objects of the present invention encompass details about feed mixtures, adsorbents, desorbents, and operating conditions all of which are hereinafter disclosed in the following discussion of each of these facets of the present invention.

DESCRIPTION OF THE INVENTION

Feed mixtures which can be utilized in the process of this invention will comprise tetra-alkyl substituted monocyclic hydrocarbon isomers having alkyl constituents containing from one to four carbon atoms each. Specifically, the isomers contained in feed mixtures which may be used in the process of this invention are characterized by the Formula 1 as shown below:

Formula 1

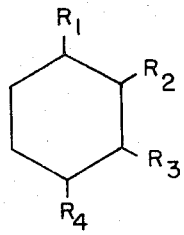

wherein $R_1$, $R_2$, $R_3$ and $R_4$ are alkyl groups which may be positioned at any four of the possible six positions on the aromatic ring to allow tetra-alkyl substitution. The R substitutional groups can include alkyl groups ranging from the methyl group up to and including groups having four carbon atoms. The alkyl side chains can be both normal and branched in nature.

Because separation of a desired aromatic isomer by selective adsorption on a zeolitic adsorbent apparently takes place because of the relative basicity of the various isomers and a rather delicate acidity/basicity difference between the desired isomer and the adsorbent, it is preferred that the alkyl chains be saturated. It is believed that unsaturation of the alkyl chains of the isomers in the feed mixture will make the isomers less susceptible to separation by interferring with these relationships that produce an adsorbent selective for a desired isomer thereby making separation possible.

Because relative basicity varies with the lengths of alkyl chains it is also preferred in the process of this invention to use feed mixtures containing isomers having an equal number of carbon atoms per molecule. It is more preferable that the feed mixture used contain isomers having as their only differences the location of the alkyl substituted groups in the four positions around the aromatic ring.

The feed mixtures may also contain small quantities of non-aromatics such as straight or branched chain paraffins, cycloparaffins, or olefinic materials. Since these materials, especially olefins, may reduce the selectivity of the adsorbent for the desired aromatic isomer, these contaminants should preferably be less than about 20 vol. % of the feed stock passed into the process and more preferably less than about 10 vol. %.

Feed mixtures which can be employed in the process of our invention can include for instance, the various isomers of trimethylcumene which at the present time are tetra-alkyl substituted monocyclic aromatic hydrocarbon isomers of particular commercial interest and potential. More specifically, the 2,4,5-TMC isomer is a substitute for durene, 1,2,4,5-tetramethylbenzene, which is oxidized to pyromellitic dianhydride (PMDA) and is used for the production of polymide resins. These polymers have the ability to withstand temperatures of 500°F. continuously and up to 900°F. intermittently.

Since the worldwide production of durene is at a much lower volume than pseudocumene, 1,2,4-trimethylbenzne, the production of PMDA from isopropylpseudocumene (2,4,5-TMC) is of potential merit if it can be separated from the other TMC isomers.

Isopropylpseudocumene is made by the alkylation of pseudocumene with propylene in the presence of hydrogen fluoride or solid phosphoric acid catalyst. However, this alkylation results in the formation of a roughly 70-30 vol. % mixture of 2,4,5-TMC and 2,3,5-TMC with a minor amount, 2% or less of the 2,3,6-TMC isomer. It is this mixture which is a particularly preferred feed mixture for this process of our invention. Since the isomers are close boiling, their separation by distillation is not practical.

To separate isomers contained in the feed mixture, the mixture is contacted with the adsorbent and one or more isomers is more selectively adsorbed and retained by the adsorbent while one or more isomers is less selectively adsorbed and is removed from the interstitial void spaces between the particles of adsorbent and the surface of the adsorbent. The adsorbent containing the more selectively adsorbed isomer is referred to as a "rich" adsorbent — rich in the more selectively adsorbed isomer. The more selectively adsorbed isomer is commonly referred to as the extract component of the feed mixture, while the less selectively adsorbed component is referred to as the raffinate component. Fluid streams leaving the adsorbent comprising an extract component and comprising a raffinate component are referred to, respectively as the extract stream and the raffinate stream. Since it can be appreciated that an extract component is not 100% adsorbed by the adsorbent, nor is the raffinate component 100% non-adsorbed by the adsorbent, small amounts of a raffinate component can appear in the extract stream and, likewise, small amounts of an extract component can appear in the raffinate stream. The extract and raffinate streams then are further distinguished from each other and from the feed mixture by the ratio of the isomers appearing in the feed stream. More specifically, the ratio of the more selectively adsorbed isomer to the less selectively adsorbed isomer will be higher in the extract stream than in either the feed mixture or the raffinate stream. Likewise, the ratio of the less selectively adsorbed isomer to the more selectively adsorbed isomer will be higher in the raffinate stream than in either the feed mixture or the extract stream.

For example, in a feed mixture prepared by the alkylation or pseudocumene with propylene in the presence of hydrogen fluoride comprising 2,4,5-TMC, 2,3,5-TMC and 2,3,6-TMC, the latter two isomers will both be selectively adsorbed (or extract components) while the 2,4,5-TMC isomer will be less selectively adsorbed (or the raffinate component). Since an adsorbent separation process using a solid adsorbent is normally sized based on the amount of the extract component (or components), the process of our invention is uniquely suited to the above separation since the desired 2,4,5-TMC constitutes the majority (about 70 vol. %) of the feed mixture described above and is the raffinate component rather than the extract component.

The adsorbent can be contained in one or more chambers where through programmed flow into and out of the chamber separation of the isomers is effected. The adsorbent may then be contacted with a desorbent material which is capable of displacing the adsorbed isomer from the adsorbent. Alternatively, the adsorbed isomer could be removed from the adsorbent by purging or by increasing the temperature of the adsorbent or by decreasing the pressure of the chamber or vessel containing the adsorbent or by a combination of these means.

The adsorbent may be employed in the form of a dense compact fixed bed which is alternately contacted with the feed mixture and a desorbent material (hereinafter described). In the simplest embodiment of the invention the adsorbent is employed in the form of a single static bed in which case the process is only semi-continuous. A set of two or more static beds may be employed in fixed-bed contacting with appropriate valving so that the feed mixture is passed through one or more adsorbent beds while the desorbent material is passed through one or more of the other beds in the set. The flow of feed mixture and desorbent material may be either up or down through the adsorbent. Any of the conventional apparatus employed in static bed fluid-solid contacting may be used.

Moving bed or simulated moving bed systems, however, have a much greater separation efficiency than fixed adsorbent bed systems and are therefore preferred.

More specifically, a more preferred processing flow scheme which can be utilized to effect the process of this invention is that which is known in the art as the simulated moving-bed countercurrent system. These systems include flow schemes similar to that described in U.S. Pat. No. 2,985,589 issued to D. B. Broughton. This patent generally describes the processing sequence involved in a simulated moving-bed counter-current solid-fluid contacting process. In fact, the processing sequence generally described in that patent are preferred modes of operating the separation process disclosed herein.

With that processing sequence therefore, one embodiment of our invention is a process for separating tetra-alkyl substituted monocyclic aromatic hydrocarbon isomers from a feed mixture comprising at least two of said isomers which process comprises the steps of: contacting said mixture at adsorption conditions with a particular zeolitic adsorbent thereby selectively adsorbing at least one isomer; withdrawing from the adsorbent bed a stream comprising a less selectively adsorbed isomer in the feed; contacting the adsorbent at desorption conditions with a desorbent material to effect the removal of the selectively adsorbed isomer from the adsorbent; and, withdrawing from the adsorbent a stream comprising desorbent material and the selectively adsorbed isomer.

Preferred operating conditions for both adsorption and desorption of this particular process include a temperature within the range of from about 70°F. to about 450°F. and a pressure within the range of from about atmospheric to about 500 psig. Furthermore, both adsorption and desorption are preferably effected at conditions selected to maintain liquid phase throughout the bed of adsorbent.

Adsorption and desorption could, of course, be conducted both in the vapor phase or liquid phase or one operation may be conducted in the vapor phase and the other in the liquid phase. Operating pressures and temperatures for adsorption and desorption might be the same or different.

The desorbent materials which can be used in the various processing schemes employing this adsorbent will vary depending on the type of operation employed. The term "desorbent material" as used herein means any fluid substance capable of removing a selectively adsorbed isomer from the adsorbent. In the swing-bed system in which the selectively adsorbed isomer is removed from the adsorbent by a purge stream, gaseous hydrocarbons such as methane, ethane, etc., or other types of gases such as nitrogen or hydrogen may be used at elevated temperatures or reduced pressures or both to effectively purge the adsorbed isomer from the adsorbent.

However, in processes which are generally operated at substantially constant pressures and temperatures to insure liquid phase the desorbent material relied upon must be judiciously selected in order that it may displace the adsorbed isomer from the adsorbent with reasonable mass flow rates and also without unduly preventing the adsorbed isomer from displacing the desorbent in a following adsorption cycle.

Desorbent materials which can be used in the process of this invention should additionally be substances which are easily separable from the feed mixture that is passed into the process. In desorbing the preferentially adsorbed component of the feed both desorbent and the desorbed feed component are removed from the adsorbent in admixture. Without a method of separation of these two materials, the purity of the selectively adsorbed component of the feed stock would not be very high since it would be diluted with desorbent. It is contemplated that a desorbent material having a different boiling range than the feed mixture used should be used in this process. The boiling range of the desorbent material could be higher or lower than that of the feed mixture. The use of a different boiling range allows a simple separation by fractionation or other methods to remove desired feed components from the desorbent and allow reuse of the desorbent in the process.

In the preferred isothermal, isobaric liquid phase operations, it is preferred to use an aromatic-containing desorbent material with toluene- and diethylbenzene-containing desorbents being especially preferred for this type of operation. Mixtures of these aromatics with non-aromatics such as paraffins have been found to be particularly effective. More specifically, we have found that a 50/50 vol. % mixture of toluene and isooctane is particularly effective as a desorbent material in the separation of trimethylcumene isomers by the method of this invention.

One can appreciate that certain characteristics of adsorbents are highly desirable, if not absolutely necessary, to the successful operation of a selective adsorption process. Among such characteristics are: adsorptive capacity for some volume of an isomer per volume of adsorbent; the selective adsorption of an isomer with respect to the other aromatic isomers and the desorbent; and sufficiently fast rates of adsorption and desorption of the adsorbed isomer to and from the adsorbent.

Capacity of the adsorbent for adsorbing a specific volume of an isomer is, of course, a necessity; without such capacity the adsorbent is useless for adsorptive separation. Furthermore, the higher the adsorbent's capacity for the component to be adsorbed, the better is the adsorbent. Increased capacity of a particular adsorbent makes it possible to reduce the amount of adsorbent needed to separate the desired component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The second necessary adsorbent characteristic is the ability of the adsorbent to separate components of the feed; or, in other words, the selectivity, (B), of the adsorbent for one component as compared to another component. Selectivity can be expressed not only for the desired isomer as compared to the other isomers, but can also be expressed between any feed stream isomer and the desorbent. The selectivity (B) as used throughout this specification is defined as the ratio of the two components of the adsorbed phase over the ratio of the same two components in the unadsorbed phase at equilibrium conditions.

Selectivity is shown as Equation 1 below:

Equation 1

$$\text{Selectivity} = (B) = \frac{[\text{vol. percent C/vol. percent D}]_A}{[\text{vol. percent C/vol. percent D}]_U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity of the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important characteristic is the rate of exchange of the adsorbed isomer with the desorbent, or, in other words, the relative rate of desorption of the adsorbed isomer. This characteristic relates directly to the amount of desorbent that must be employed in the process to recover the adsorbed isomer from the adsorbent.

In order to test various adsorbents to measure the characteristics of adsorptive capacity and selectivity, a dynamic testing apparatus is employed. The apparatus consists of an adsorbent chamber of approximately 70 cc. volume having inlet and outlet portions at opposite ends of the chamber. The chamber is contained within a temperature control means and, in addition, pressure control equipment is used to operate the chamber at a constant predetermined pressure. Chromatographic analysis equipment can be attached to the outlet line of the chamber and used to analyze "on-stream" the effluent stream leaving the adsorbent chamber.

A pulse test, performed using this apparatus and the following general procedure, is used to determine selectivities and other data for various adsorbent systems. The adsorbent is filled to equilibrium with a particular desorbent by passing the desorbent through the adsorbent chamber. At a convenient time, a pulse of feed containing known concentrations of a non-adsorbed paraffinic tracer (n-nonane for instance) and of the particular aromatic isomers all diluted in desorbent is injected for a duration of several minutes. Desorbent flow is resumed, and the tracer and the aromatic isomers are eluted as in a liquid-solid chromatographic operation. The effluent can be analyzed by on-stream chromatographic equipment and traces of the envelope of corresponding component peaks developed. Alternatively, effluent samples can be collected periodically and later analyzed separately by gas chromatography.

From information derived from the chromatographic traces, adsorbent performance can be rated in terms of capacity index for the adsorbed isomer, selectivity for one isomer with respect to the other, and the rate of desorption of adsorbed isomer by the desorbent. The capacity index may be characterized by the distance between the center of the peak envelope of the selectively adsorbed isomer and the peak envelope of the tracer component or some other known reference point. It is expressed in terms of the volume in cubic centimeters of desorbent pumped during this time interval. Selectivity, (B), for the adsorbed isomer with respect to the non-adsorbed isomer may be characterized by the ratio of the distance between the center of the adsorbed isomer peak envelope and the tracer peak envelope (or other reference point) to the corresponding distance for the other (non-adsorbed) isomer. The rate of exchange of the adsorbed isomer with the desorbent can generally be characterized by the width of the peak envelopes at half intensity. The narrower the peak width the faster the desorption rate. The desorption rate can also be characterized by the distance between the center of the tracer peak envelope and the disappearance of the selectively adsorbed isomer which has just been desorbed. This distance is again the volume of desorbent pumped during this time interval.

To translate this type of data into a practical separation process requires actual testing of the best system in a continuous countercurrent liquid-solid contacting device. The general operating principles of such a device have been previously described and are found in Broughton U.S. Pat. No. 2,985,589. A specific laboratory-size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper "Separation of $C_8$ Aromatics by Adsorption" by A. J. deRosset, R. W. Neuzil, D. J. Korous and D. H. Rosback presented at the American Chemical Society, Los Angeles, Calif., Mar. 28 through Apr. 2, 1971.

The feasibility of separating particular tetra-alkyl substituted monocyclic aromatic hydrocarbon isomers by selective adsorption, which was demonstrated by pulse test results, was confirmed by continuous testing in the laboratory-sized apparatus described above.

Adsorbents which can be used in the process of this invention are generally referred to as the crystalline aluminosilicates or molecular sieves and can comprise both the natural and synthetic aluminosilicates. Particular crystalline aluminosilicates encompassed by the present invention include crystalline aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecules sizes as, for instance, when normal paraffins are separated from isoparaffins by using molecular sieves. In the process of this invention, however, the term molecular sieves is not strictly suitable since the separation of specific isomers is dependent on electrochemical attraction of different isomer configurations rather than pure physical size differences in the isomer molecules.

In hydrated form, the crystalline aluminosilicates generally encompass those zeolites represented by formula 2 below:

FORMULA 2

$$M_{2/n}O:Al_2O_3:wSiO_2:yH_2O$$

where M is a cation which balances the electrovalence of the tetrahedra and is generally referred to as an exchangeable cationic site, $n$ represents the valence of the cation, $w$ represents the moles of $SiO_2$ and $y$ represents the moles of water. The cations may be any one of a number of cations which will be hereinafter described in detail.

The type X structured and type Y structured zeolites as used in this specification shall include crystalline aluminosilicates having a three dimensional interconnected cage structure and can specifically be defined by U.S. Pat. Nos. 2,882,244 and 3,130,007. The terms "type X structured" and "type Y structured" zeolites shall include all zeolites which have a general structure as represented in the above two cited patents and specifically include those structured containing various cations exchanged upon the zeolite. In the most limiting sense these terms refer to type X and type Y zeolites.

The type X structured zeolites can be represented in terms of mole oxides as represented in Formula 3 below:

FORMULA 3

$$(0.9\pm0.2)M_{2/n}O:Al_2O_3:(2.5\pm0.5)SiO_2:yH_2O$$

where M represents at least one cation having a valence of not more than 3, $n$ represents the valence of M and $y$ is a value up to about 9 depending upon the identity of M and the degree of hydration of the crystalline structure.

The type Y structured zeolite can be represented in terms of the mole oxides for the sodium form as represented by Formula 4 below:

FORMULA 4

$$(0.9\pm0.2)Na_2O:Al_2O_3:wSiO_2:yH_2O$$

where "$w$" is a value of greater than about 3 up to 8, and "$y$" may be any value up to about 9.

Adsorbents contemplated herein include not only the sodium form of the type Y zeolite but also crystalline materials obtained from such a zeolite by partial or complete replacement of the sodium cation with other individual cations or group of cations as hereinbelow specified. Similarly, the type X zeolite also may be ion-exchanged. The term "exchangeable cationic sites" for the type X and type Y zeolites generally refers to the sodium cations present in the type X and type Y zeolite as indicated in Formula 3 and Formula 4 above which can be replaced or exchanged with other cations to modify the properties of these zeolites.

Cationic or base exchanged methods are generally known to those familiar with the field of crystalline aluminosilicate production. They are generally performed by contacting the zeolite with an aqueous solution of the soluble salt of the cation or cations desired to be placed upon the zeolite. After the desired degree of exchange takes place the sieves are removed from the aqueous solution, washed and dried to a desired water content. It is contemplated that cation exchange operations may take place using individual solutions of desired cations placed on the zeolite or using an exchange solution containing a mixture of cations, where two or more desired cations are to be placed on the zeolite.

We have found that the cations which may be placed on the type X or type Y zeolite at the cationic exchangeable sites to produce an adsorbent having properties which make possible the process of this invention include at least one cation selected from the group consisting of Group I-A metals. More specifically we have found that there is no adsorption of the tetra-alkyl substituted monocyclic aromatic hydrocarbon isomers by a divalent metal exchanged type X or Y zeolite. Barium exchanged or calcium exchanged type X zeolites for instance demonstrate no adsorption for the trimethylcumene. We conclude that the cross sectional area of the tetra-alkyl substituted aromatic is too large to allow them to enter the pores of the divalent metal exchanged type X or Y zeolites and that therefore isomer separation based upon acidity/basicity differences cannot take place. The more particularly preferred Group I-A cations to occupy cationic exchangeable sites in the type X or Y zeolite used as adsorbents in the process of this invention will be at least one cation selected from the group consisting of sodium, potassium and cesium cations. Even more preferred, the cation will be the potassium cation.

When singular cations are based exchanged upon a zeolite the singular cations can comprise anywhere from 5 to 75 wt. % on a relative volatile free basis of the zeolite depending upon the molecular weight of the material exchanged upon the zeolite. It is contemplated that when single cations are placed upon the zeolite that they may be on the zeolite in concentrations of from about 1% to about 100% of the original cations present upon the zeolite prior to its being ion-exchanged. By knowing the empirical formula including the silica to alumina ratio of the zeolite used, its water content, and the percentage of binder used, if any, it is possible to calculate the percentage of ion exchange that has taken place.

When more than one Group I-A cation is to be placed upon the zeolite there are two parameters in which one can operate in order to effectively provide a zeolite having the maximum selective properties. One of the parameters is the extent of the zeolite ion exchange which in turn is determined by the length of exchange time, exchange temperature and concentration of the cations in the exchange solution. The other parameter is the ratio of individual cations placed on the zeolite.

In the process of this invention we have found additionally that the presence of critical amounts of certain substrates on the adsorbents improves the adsorbent's selectivity for one isomer with respect to another. This increase may make possible a reduction in the amount of adsorbent needed to achieve a specific isomer separation from a particular type and charge rate of feed mixture.

The term "substrate" as used in this specification shall mean any modifying or activating substance. In this context, it is a substance which modifies certain adsorbent characteristics. The exact mechanism by which certain substrates increase the adsorbent's selectivity for one isomer with respect to another is not fully understood. It is thought that certain substrates modify the acidity/basicity relationship that exists among certain adsorbents and both feed and desorbent materials that contact such adsorbents, and by this means effect isomer selectivities.

A suitable and preferred substrate will include a substrate selected from the group consisting of water, methanol and ethanol. The amount of these substrates to be used, we have found, is quite critical because too much of any substrate can decrease rather than enhance selectivities, and can additionally decrease capacities. The preferred range of these substrates is from about 0.2 to 2 wt. % of the adsorbent, on a volatile-free basis. This substrate may be added to the adsorbent either on an intermittent or more preferably on a continuous basis by itself or in admixture with feed or desorbent material to maintain the desired concentration of the substrate on the adsorbent.

In this specification, the volatile matter content of the zeolitic adsorbent is determined by first weighing the adsorbent and thereafter contacting the adsorbent in a high temperature furnace at a temperature of from about 400°C. to about 900°C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated on a loss on ignition (LOI) and represents the volatile matter present within the adsorbent. A specific example would be a 100 gram sample of the zeolitic adsorbent placed into a muffle furnace at about 500°C. for a period of 5 to 6 hours with a dry nitrogen purge gas passing over the zeolite. The zeolite is then removed from the furnace, cooled under an inert atmosphere, and reweighed yielding a total weight of about 95 grams. On this basis, the original adsorbent can be said to have contained 5 wt. % volatile matter. The chemical analyses performed on the zeolites are reported on a volatile-free basis and are determined by taking into account the amount of material which is lost by determination of volatile matter and correcting the individual chemical analysis in weight percent to take this factor into consideration. As well, the substrates described above are added to the process based upon the volatile-free amount of adsorbent.

EXAMPLE

This example presents specific results of pulse tests which were performed primarily to demonstrate a particular adsorbent's ability to separate specific tetraalkyl substituted monocyclic aromatic hydrocarbon isomers and also to show the effect of various substrates on the adsorbent's performance. The example is intended to specifically demonstrate the feasibility of employing the process of our invention to separate certain aromatic isomers and is not intended to be a limitation on the scope of this invention, but rather a specific illustration.

The adsorbent used in each of the pulse tests was potassium exchanged type X structured zeolite. The adsorbent was prepared by ion-exchanging a base material comprising 13X zeolite of approximately 20–40 mesh particle size with a 2 wt. % potassium chloride solution to give a volatile-free potassium oxide content of about 9 wt. % and then drying the ion-exchanged zeolite to a water level of about 2 wt. %.

Prior to being used in a test, 70 cc. portions of adsorbent were calcined in a muffle furnace for 1 hour at 400°C. and then loaded into the pulse test column. The column was maintained at 175°C. process temperature with constant pressure of 60 psig. during the entire operation.

The feed mixture used for the pulse tests comprised the product from the HF alkylation of pseudocumene with propylene and about 5 vol. % n-nonane as a tracer. The alkylation product was approximately 70 vol. % 2,4,5-TMC and 30 vol. % 2,3,5-TMC with a minor amount of the 2,3,6-TMC isomer. The desorbent material employed was a blend of 50 vol. % toluene and 50 vol. % isooctane. The feed mixture was introduced into the test column via a 4.7 ml sample loop and effluent samples from the column were collected every 2 minutes with an automatic sample collector. The samples were then analyzed by chromatographic equipment and traces of the component peaks were developed.

From information derived from the chromatographic traces selectivities of the adsorbent for the 2,3,5-TMC isomer with respect to the 2,4,5-TMC isomer were obtained in the manner previously described. Additionally, retention volumes of the selectively adsorbed 2,3,5-TMC isomer per 70 cc's of adsorbent were obtained as an indication of capacity.

The results of six pulse tests, A, B, C, D, E, and F shown in Table 1 below demonstrate the capability of separating TMC isomers and also indicate the effects of substrates at different concentrations upon adsorbent performance.

Table No. 1

Selectivities of K Exchanged Type X Zeolite for 2,3,5-Trimethylcumene
With Respect To 2,4,5-Trimethylcumene by Pulse Test

| Test | A | B | C | D | E | F |
|---|---|---|---|---|---|---|
| Substrate | Dry* | 2 wt.% $H_2O$ | 4 wt. % $H_2O$ | 1 ml of methanol/70 cc adsorbent | 5 ml of methanol/70 cc adsorbent | 1 ml of ethanol/70 cc adsorbent |
| Selectivity: 2,3,5-/2,4,5-TMC | 2.13 | 2.28 | 1.34 | 2.20 | 1.0 | 2.20 |
| Ret. Volume. cc. 2,3,5-TMC per 70 cc adsorbent | 16.4 | 15.0 | 9.0 | 15.0 | 5.0 | 17.0 |

* Calcined in muffle furnace at 400°C. for 1 hour

Test A was performed with no substrate added into the adsorbent; tests B and C were conducted with water added as a substrate; tests D and E were with methanol as a substrate and Test F was with ethanol as a substrate.

Test A indicates the adsorbent's ability with no substrate to selectively adsorb 2,3,5-TMC with respect to the 2,4,5-TMC isomer thereby making separation of the desired 2,4,5-TMC isomer possible. Tests B, D and F show that with judicious amounts of water, methanol and ethanol respectively added as substrates the selectivities of the adsorbent for the 2,3,5-TMC isomer are increased over the selectivity obtained with a dry adsorbent. Data from tests C and E indicate, however, that the benefits of the substrates are obtained only when small amounts of the substrate are employed. When 4 wt. % water was used in test C and when 5 ml of methanol was used in test E, for instance, the selectivities and capacities obtained were decreased from those obtained with the dry adsorbent in test A. Indeed in test E with 5 ml of methanol as a substrate, the selectivity had decreased to the point where the adsorbent was no longer selective for the 2,3,5-TMC isomer with respect to the 2,4,5-TMC isomer.

We claim as our invention:

1. A process for separating tetra-alkyl substituted monocyclic aromatic hydrocarbon isomers, the alkyl constituents containing from 1 to 4 carbon atoms each, from a feed mixture comprising at least two of said isomers which process comprises contacting said feed with a crystalline aluminosilicate selected from the group consisting of type X structured and type Y structured zeolites containing at exchangeable cationic sites at least one cation selected from the group consisting of cations of Group I-A metals thereby selectively adsorbing at adsorption conditions one or more of said isomers.

2. The process of claim 1 further characterized in that said isomers are trimethylcumene isomers.

3. The process of claim 1 further characterized in that said crystalline aluminosilicate contains at the cationic exchangeable sites at least one cation selected from the group consisting of cations of sodium, potassium and cesium.

4. The process of claim 1 further characterized in being effected at a temperature within the range of from about 70°F. to about 450°F. and at a pressure within the range of from about atmospheric to about 500 psig.

5. A process for separating trimethylcumene isomers from a hydrocarbon feed mixture comprising 2,4,5-trimethylcumene and at least one other trimethylcumene isomer which process comprises contacting said feed with a solid adsorbent selected from the group consisting of type X and type Y structured zeolites containing at exchangeable cationic sites at least one cation selected from the group consisting of cations of sodium, potassium and cesium, whereby there is obtained a raffinate stream comprising a less selectively adsorbed component of said mixture and a rich adsorbent containing a more selectively adsorbed component of said mixture, the ratio of said isomers in said raffinate stream being different from the ratio of said isomers in said feed mixture.

6. The process of claim 5 further characterized in that said solid adsorbent is a type X structured zeolite and contains potassium cations at the exchangeable cationic sites within said zeolite.

7. The process of claim 5 further characterized in that said solid adsorbent contains a modifier selected from the group consisting of water, methanol and ethanol.

8. The process of claim 5 further characterized in being effected at a temperature within the range of from about 70°F. to about 450°F. and at a pressure within the range of from about atmospheric to about 500 psig.

9. The process of claim 5 including the step of treating said rich adsorbent at desorption conditions with a desorbent material to desorb said adsorbed component therefrom as part of an extract stream.

10. The process of claim 9 further characterized in that said desorbent material has a boiling point substantially different from that of the trimethylcumene isomers.

11. The process of claim 10 further characterized in that said desorbent material comprises toluene.

12. The process of claim 5 further characterized in that 2,4,5-trimethylcumene is a less selectively adsorbed component of said feed mixture.

13. The process of claim 5 further characterized in that said feed mixture is obtained from the alkylation of pseudocumene with propylene in the presence of hydrogen fluoride.

14. A process for separating at least one trimethylcumene isomer from a hydrocarbon feed mixture comprising 2,4,5-trimethylcumene and at least one other trimethylcumene isomer which process comprises the steps of:

a. contacting the feed mixture with a bed of solid adsorbent selected from the group consisting of type X and type Y structured zeolites containing at exchangeable cationic sites at least one cation selected from the group consisting of cations of sodium, potassium and cesium at adsorption conditions to effect the selective adsorption of an isomer;
b. withdrawing from the bed of solid adsorbent a stream comprising less selectively adsorbed 2,4,5-trimethylcumene;
c. contacting the adsorbent bed at desorption conditions with a desorbent material having a boiling point substantially different from that of the trimethylcumene isomers to effect the removal of the selectively adsorbed isomer; and,
d. withdrawing from the solid adsorbent bed a stream comprising desorbent material and the selectively adsorbed isomer.

15. The process of claim 14 further characterized in that said solid adsorbent is type X structured zeolite and contains potassium cations at the cationic exchangeable sites within said zeolite.

16. The process of claim 14 further characterized in that said adsorption conditions and desorption conditions include a temperature within the range of from about 70°F. to about 450°F. and a pressure within the range of from about atmospheric to about 500 psig.

17. The process of claim 14 further characterized in being effected in the liquid phase.

18. The process of claim 14 further characterized in that said desorbent material comprises toluene.

19. The process of claim 14 further characterized in that said solid adsorbent contains a modifier selected from the group consisting of water, methanol and ethanol.

20. The process of claim 14 further characterized in that said feed mixture is obtained by the alkylation of pseudocumene with propylene in the presence of hydrogen fluoride.

* * * * *